Nov. 2, 1965  G. G. HEARD, JR  3,215,820

VEHICLE IDENTIFICATION SYSTEM

Filed March 26, 1962

INVENTOR.
GEORGE G. HEARD JR.

BY
Robert R. Strack

ATTORNEY

United States Patent Office 3,215,820
Patented Nov. 2, 1965

3,215,820
VEHICLE IDENTIFICATION SYSTEM
George Guy Heard, Jr., Roanoke, Va., assignor to General Electric Company, a corporation of New York
Filed Mar. 26, 1962, Ser. No. 182,522
7 Claims. (Cl. 235—61.11)

This invention relates to systems for communicating information between moving vehicles and a fixed location. More particularly, it relates to systems for identifying vehicles, the cargo therein, or particular characteristics thereof, as they pass a fixed location.

The invention has particular application to the railroad industry; however, those skilled in the art will recognize applicability to other industries wherein moving vehicles must be discretely identified. Present railroad traffic procedures require that individual cars be identifiable. In conventional operation, freight is loaded into individual cars and waybills are made up giving details including the route to be taken by each car between the origin and destination points. Cars having a portion of their routes in common are assembled into trains for transportation over the common portion. Upon reaching the end of the portion, the cars are reassembled into new trains for succeeding common portions. At the reassembly yards, each car must be identified and associated with its waybill in order to facilitate the necessary assembly of new outgoing trains.

Currently, individual cars are visually identified by means of the owner railroad and the car serial number which is imprinted on the side of the car or in some other conspicuous location. Disadvantages of this practice include: the required maintenance of the information in cognizable form; the necessarily inefficient reading, recording, and utilization means available; and the introduction of human error.

Several techniques have been proposed in order to establish improved identification systems. One technique is an extension of the visual system by means of television circuits, wherein a television monitor at trackside permits examination from a remote point of the car numbers as they approach a yard. Another technique uses electromagnetic coupling between tuned circuits or oscillating sources associated with each car and an interrogating source located at trackside. Still another technique employs photoelectric effects and discretely identifies each car by impressing thereon a particular pattern which yields a selected response to illumination from a trackside source. Yet another technique, and the one contemplated by the present invention, uses magnetic coupling between equipment on each car and a trackside interrogating means.

Obviously, a system achieves increasing value as it provides the services required with less complexity, less expense, and more efficiency. The heretofore proposed techniques, while providing improvements over a purely manual and visual examination of each car, generally introduce equipment of some expense which is subject to wear and deterioration. The introduction of selected patterns or the use of television circuits still requires exposed surfaces on each car which are subject to weather erosion, vandalism, and obscuration. Also, the use of active responders such as oscillators or premagnetized units within each car ultimately leads to maintenance expense.

An object of the present invention is to provide improved means for identifying vehicles or particular characteristics of vehicles.

Another object of the invention is to provide novel, reliable, and permanent means for identifying vehicles or particular characteristics of vehicles.

Still another object of the invention is to provide improved means for identifying vehicles or characteristics of vehicles offering a high level of signal power and thereby permitting employment of more economical and reliable control circuits.

Magnetic coupling techniques are well adapted to railroad car identification, because railroad cars are generally constructed of magnetic materials. The techniques of the existing art require selectively magnetizing some portion of a car and translating that portion past a stationary induction coil or coils. This causes a current in the coil or coils which represents the particular magnetization imposed. The magnetization that has been suggested must be continuously re-established prior to each reading, or at least periodically re-established. Furthermore, these systems do not furnish identification information in a form immediately usable in conventional control equipment such as card printers and readers.

Another object of the invention is to provide improved magnetic means for identifying vehicles as they pass a stationary point.

In accordance with the invention, means are provided for establishing magnetic fields of similar polarity on each rail of a railroad track. When a car passes this portion of track, a plurality of magnetic circuit paths are selectively established including the wheels, the axle, magnetic coding means, and a plurality of induction coils disposed across the tracks. In a particular illustrative embodiment, the coding means comprises a plurality of coding discs mounted on an axle in planes parallel to the wheels. These coding discs are made of low reluctance material and are selectively disposed along the axle of the wheels in accordance with a coded designation for each car. As a car passes, the coils in positions directly below coding discs have a current induced therein which discretely identifies the car.

A feature of the present invention relates to magnetic means for generating identification information in easily utilized binary form. This feature eliminates the problems inherent in systems which use varying signal strengths to establish discrete conditions.

Another feature of the invention resides in the use of coding means whereby car identification is established permanently.

The novel features of the invention are set forth with particularity in the claims. The invention itself, however, both as to its organization and method of operation, together with further objects and features thereof, may best be understood and appreciated by referring to the following description taken in conjunction with the accompanying drawing wherein:

Figure 1:
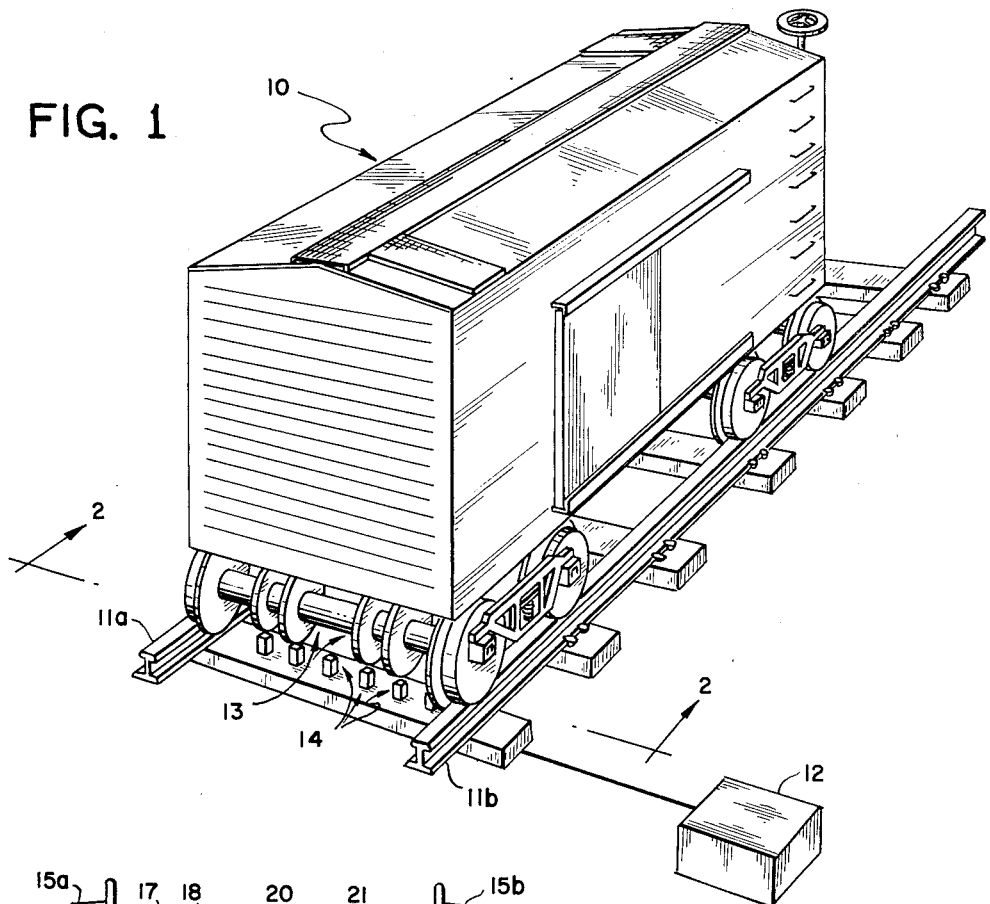
FIG. 1 shows a freight car passing an interrogation point.

An understanding of the position in which the apparatus of the invention may be mounted, is available from consideration of FIG. 1. The basic elements of this figure comprise a typical railroad car 10, on tracks 11a, 11b, adjacent to a point at which substation equipment 12 is located. Coding discs 13 are illustrated on the leading truck of car 10 and are in a position directly over interrogating coils 14. The interrelationship of the coding discs and coils is shown clearly in FIG. 2.

Figure 2:
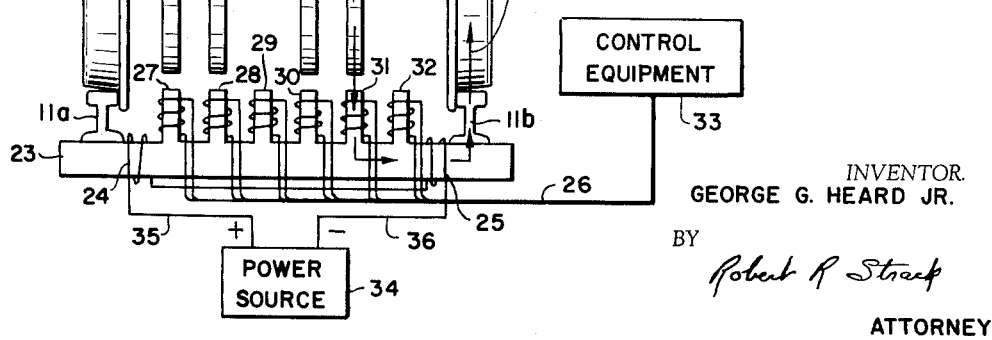
FIG. 2 is a partial-sectional view taken along line 2—2 in FIG. 1 illustrating a typically coded freight car truck.

For clarity, FIG. 2 is enlarged and simplified to include only those elements directly pertinent to the practice of the invention. These elements include: wheels 15a, 15b, axle 16, coding discs 17, 18, 20, 21, tracks 11a, 11b, and an interrogating means 23. Interrogating means 23 is fabricated from a low reluctance magnetic material and comprises an elongated portion having protrusions 27–32 which are positioned between tracks 11a and 11b directly below all possible positions of the coding discs. The protrusions are of a length to bring them in close proximity to passing coding discs and each protrusion has a coil wound thereon which is adapted to have current induced therein in response to a changing magnetic flux. Each coil is connected to control equipment 33 via a cable 26.

The operation of the present invention relies upon the principle that a changing magnetic flux produces current in a conductor that is present in the flux field. In essence, a plurality of possible flux fields are created and the presence or absence of a particular field is recognized as a discrete one of two possible conditions. Selected permutations and combinations of these discrete conditions are then used to identify particular cars.

The energy source for the flux fields consists of coils 24 and 25 connected to power source 34. These coils are wound upon the elongated portion of interrogating means 23 to produce magnetic poles of like polarity at each track 11a and 11b. In the absence of a railroad car, the magnetic reluctance between the tracks 11a, 11b, and the protrusions 27–32, is extremely high and negligible magnetic field density occurs. In the presence of a railroad car, however, the coding discs furnish a plurality of low reluctance magnetic paths. As the car passes, the flux density in the protrusions under coding discs greatly increases and then decays, and the changing flux induces current in the coils associated with the protrusions included in the flux fields. A typical magnetic flux path during presence of a car is illustrated by arrows 37. It includes: the elongated portion of interrogating member 23, track 11b, the lower portion of wheel 15b, axle 16, the lower portion of coding discs 21, and protrusion 31. The coils associated with protrusions that are not directly under a coding disc, for example on protrusions 29 and 32 in FIG. 2, experience no significant change of magnetic flux and consequently, have no significant current induced therein. Of course, the number of coding discs and protrusions used is dependent upon the number of discrete indications desired.

Control equipment 33 may take many forms. Its function is to convert the information received over cable 26 into usable form. Because the information is already in binary form, equipment 33 is relatively simple and easily procured. Once a car is identified, the most expeditious procedures for forwarding it to its destination may be employed.

A particular embodiment of the invention has been shown wherein passive coding means are mounted upon a railroad car, interrogating means are disposed across a railroad track, and a magnetomotive force is applied at the rails to produce selective co-action between the coding means and interrogating means which will discretely identify the car. It will, of course, be understood that it is not wished to be limited to the illustrated embodiment since modifications may be made therein and it is contemplated in the appended claims to cover any such modifications as fall within the true spirit and scope of the invention.

What is claimed as new and desired to be secured by Letters Patent of the United States is:

1. A system for identifying vehicles comprising, means structurally associated with each of said vehicles for selectively establishing discrete low reluctance paths between a first location thereon and a plurality of additional locations thereon, interrogating means for generating a magnetic field in the path of said vehicle having one pole arranged to come in proximity to said first location and the other pole distributed to come in proximity to said plurality of additional locations, and sensing means responsive to the change in flux density during proximity of said locations to said interrogating means for generating signals representative of the existence and relative positions of said low reluctance paths.

2. A system for identifying vehicles comprising, means for guiding said vehicles along a predetermined track, means structurally associated with each of said vehicles for selectively establishing discrete low reluctance paths between a first location thereon and a plurality of additional locations thereon, interrogating means positioned in said track, means for creating a magnetic flux in said interrogating means having one pole arranged to come in proximity to said first location and the other pole distributed to simultaneously come in proximity to said plurality of additional locations, and sensing means responsive to the change in flux density at each area of proximity between said plurality of locations and said interrogating means to generate signals representative of the existence and relative positions of said low reluctance paths.

3. A system for identifying vehicles comprising, means for guiding said vehicles along a predetermined track, means structurally associated with each of said vehicles for selectively establishing discrete low reluctance paths between a first location thereon and a plurality of additional locations thereon disposed across said track, interrogating means positioned across said track having protrusions extending perpendicular to the plane in which said vehicles move, said interrogating means being of low reluctance material, low reductance means adapted to interconnect said interrogating means and said first location, means for creating a magnetic flux in said interrogating means having one pole at the junction between said interrogating means and said low reluctance means and the other pole at said protrusions, and sensing means responsive to the change in flux density in said protrusions when said vehicle passes said interrogating means to generate signals representative of the existence and relative positions of said low reluctance paths.

4. A vehicle identification system as defined in claim 3 wherein said sensing means comprises, a plurality of coils each individual to one of said protrusions, and means responsive to the current induced in each of said coils to identify the particular passing vehicle discretely.

5. In a system for identifying railroad cars as they pass a particular portion of track, coding means attached to said railroad cars and arranged to establish low reluctance paths from a wheel of said cars to a plurality of points disposed along a line across said track, interrogating means positioned across said track at said particular portion having protrusions located below said plurality of points on a passing car, said interrogating means being of low reluctance material, means for creating a magnetic flux in said interrogating means having one pole at said track and the other pole at said protrusions, and sensing means responsive to the change in flux density in said protrusions when a car passes to generate signals representative of the existence and relative positions of said low reluctance paths.

6. A system as defined in claim 5 wherein said coding means comprises, a plurality of low reluctance discs disposed between a pair of wheels on said cars in planes parallel to the planes of said wheels, said discs being spaced at positions in accordance with a code representation of the identity of each of said cars and being adapted to attain close proximity to particular protrusions of said interrogating means when passing thereover.

7. A system as defined in claim 6 wherein said sensing means comprises, a plurality of coils each individual to one of said protrusions, and means responsive to the current induced in each of said coils to discretely identify the particular passing car.

References Cited by the Examiner

UNITED STATES PATENTS

| | | | |
|---|---|---|---|
| 2,414,472 | 1/47 | Loughridge | 246—2 |
| 2,693,525 | 11/54 | Kendall et al. | 246—63 X |
| 3,016,456 | 1/62 | Corporon | 246—2 |

References Cited by the Examiner

Pages 32–33, Dec. 1961, IBM Technical Disclosure Bulletin, vol. 4, No. 7.

MALCOLM A. MORRISON, *Primary Examiner.*

THOMAS B. HABECKER, *Examiner.*